(12) United States Patent
Yamada et al.

(10) Patent No.: US 10,742,465 B2
(45) Date of Patent: Aug. 11, 2020

(54) SYSTEMS AND METHODS FOR MULTI-PHYSICAL STRUCTURE SYSTEM

(71) Applicant: SHARP KABUSHIKI KAISHA, Sakai, Osaka (JP)

(72) Inventors: Shohei Yamada, Sakai (JP); Kazunari Yokomakura, Sakai (JP); Shoichi Suzuki, Sakai (JP); Hidekazu Tsuboi, Sakai (JP); Kimihiko Imamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/768,005

(22) PCT Filed: Oct. 31, 2016

(86) PCT No.: PCT/JP2016/004761
§ 371 (c)(1),
(2) Date: Apr. 12, 2018

(87) PCT Pub. No.: WO2017/073083
PCT Pub. Date: May 4, 2017

(65) Prior Publication Data
US 2018/0302254 A1 Oct. 18, 2018

Related U.S. Application Data

(60) Provisional application No. 62/247,887, filed on Oct. 29, 2015.

(51) Int. Cl.
*H04L 27/26* (2006.01)
*H04L 5/00* (2006.01)

(52) U.S. Cl.
CPC ........ *H04L 27/2607* (2013.01); *H04L 5/0044* (2013.01); *H04L 5/0053* (2013.01);
(Continued)

(58) Field of Classification Search
CPC .......... H04W 72/042; H04W 72/2601; H04W 72/02; H04W 72/04; H04W 28/06;
(Continued)

(56) References Cited

U.S. PATENT DOCUMENTS

2009/0122771 A1\* 5/2009 Cai .......................... H04J 11/00
370/338
2013/0051485 A1 2/2013 Taori et al.
(Continued)

FOREIGN PATENT DOCUMENTS

WO 2007/136212 A2 11/2007
WO 2016/130175 A1 8/2016

OTHER PUBLICATIONS

Ed Tiedemann, "5G: The Next Generation (Big Wave) of Wireless", Jul. 22, 2015.
(Continued)

*Primary Examiner* — Jung Liu
(74) *Attorney, Agent, or Firm* — ScienBiziP, P.C.

(57) ABSTRACT

A method by a user equipment (UE) is described. The method includes receiving a first physical signal, determining a first physical structure based on information in the first physical signal, and determining resource elements based on the first physical structure. A first set of subcarriers with first subcarrier spacing which is integer multiple or integer sub-multiple of second subcarrier spacing are mapped such that in addition to a slot boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols.

8 Claims, 10 Drawing Sheets

(52) U.S. Cl.
CPC ...... *H04L 27/2608* (2013.01); *H04L 27/2613* (2013.01); *H04L 27/2666* (2013.01); *H04L 5/001* (2013.01)

(58) Field of Classification Search
CPC ... H04W 72/00; H04W 72/048; H04W 88/08; H04W 72/0453; H04J 11/00; H04L 5/0094; H04L 5/0035; H04L 27/2601; H04L 5/001; H04L 5/0028; H04L 5/006; H04L 27/2607; H04L 27/2602; H04L 5/0064; H04L 5/0023; H04L 5/0042; H04L 5/0007; H04L 5/0053; H04B 7/2615

See application file for complete search history.

(56) References Cited

U.S. PATENT DOCUMENTS

| | | | |
|---|---|---|---|
| 2015/0256308 A1* | 9/2015 | Ma | H04L 5/0035 370/330 |
| 2017/0099655 A1* | 4/2017 | Golitschek Edler von Elbwart | H04L 5/0042 |
| 2017/0311232 A1* | 10/2017 | Yi | H04W 72/042 |

OTHER PUBLICATIONS

Ericsson LM et al., "Narrowband LTE—Concept Description". R1-154659. 3GPP TSG RAN WG1 Meeting #82, Beijing, China, Aug. 24th-28th, 2015.
U.S. Appl. No. 62/169,342 filed Jun. 1, 2015.

\* cited by examiner

SYSTEMS AND METHODS FOR MULTI-PHYSICAL STRUCTURE SYSTEM

CROSS REFERENCE TO RELATED APPLICATIONS

This Nonprovisional application claims priority under 35 U.S.C. § 119 on U.S. Provisional Patent Application No. 62/247,887, filed on Oct. 29, 2015, the entire contents of which are hereby incorporated by reference.

TECHNICAL FIELD

The present disclosure relates generally to communication systems. More specifically, the present disclosure relates to systems and methods for multi-physical structure system.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility, low complexity and efficiency have been sought. However, improving communication capacity, speed, flexibility, low complexity and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

SUMMARY OF INVENTION

An aspect of the invention provides a method by a user equipment (UE), comprising:
  receiving a first physical signal;
  determining a first physical structure based on information in the first physical signal; and
  determining resource elements based on the first physical structure,
  wherein the first physical structure includes resource elements;
  the resource elements are identified by indices of subcarriers in frequency and indices of orthogonal frequency-division multiplexing (OFDM) symbols in time domains; and
  a first set of subcarriers with first subcarrier spacing which is integer multiple or integer sub-multiple of second subcarrier spacing are mapped such that in addition to a slot boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols.

Another aspect of the invention provides a method by an evolved Node B (eNB), comprising:
  determining a first physical structure; and
  mapping signals to resource elements according to the first physical structure,
  wherein the first physical structure includes resource elements;
  the resource elements are identified by indices of subcarriers in frequency and indices of orthogonal frequency-division multiplexing (OFDM) symbols in time domains; and
  a first set of subcarriers with first subcarrier spacing which is integer multiple or integer sub-multiple of second subcarrier spacing are mapped such that in addition to a slot boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols.

Another aspect of the invention provides a user equipment (UE), comprising:
  a processor; and
  a memory in electronic communication with the processor, wherein instructions stored in the memory are executable to:
  receive a first physical signal;
  determine a first physical structure based on information in the first physical signal; and
  determine resource elements based on the first physical structure,
  wherein the first physical structure includes resource elements;
  the resource elements are identified by indices of subcarriers in frequency and indices of orthogonal frequency-division multiplexing (OFDM) symbols in time domains; and
  a first set of subcarriers with first subcarrier spacing which is integer multiple or integer sub-multiple of second subcarrier spacing are mapped such that in addition to a slot boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols.

Another aspect of the invention provides an evolved Node B (eNB), comprising:
  a processor; and
  a memory in electronic communication with the processor, wherein instructions stored in the memory are executable to:
  determine a first physical structure; and
  map signals to resource elements according to the first physical structure,
  wherein the first physical structure includes resource elements;
  the resource elements are identified by indices of subcarriers in frequency and indices of orthogonal frequency-division multiplexing (OFDM) symbols in time domains; and
  a first set of subcarriers with first subcarrier spacing which is integer multiple or integer sub-multiple of second subcarrier spacing are mapped such that in addition to a slot boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols.

DESCRIPTION OF EMBODIMENTS

Figure 1:
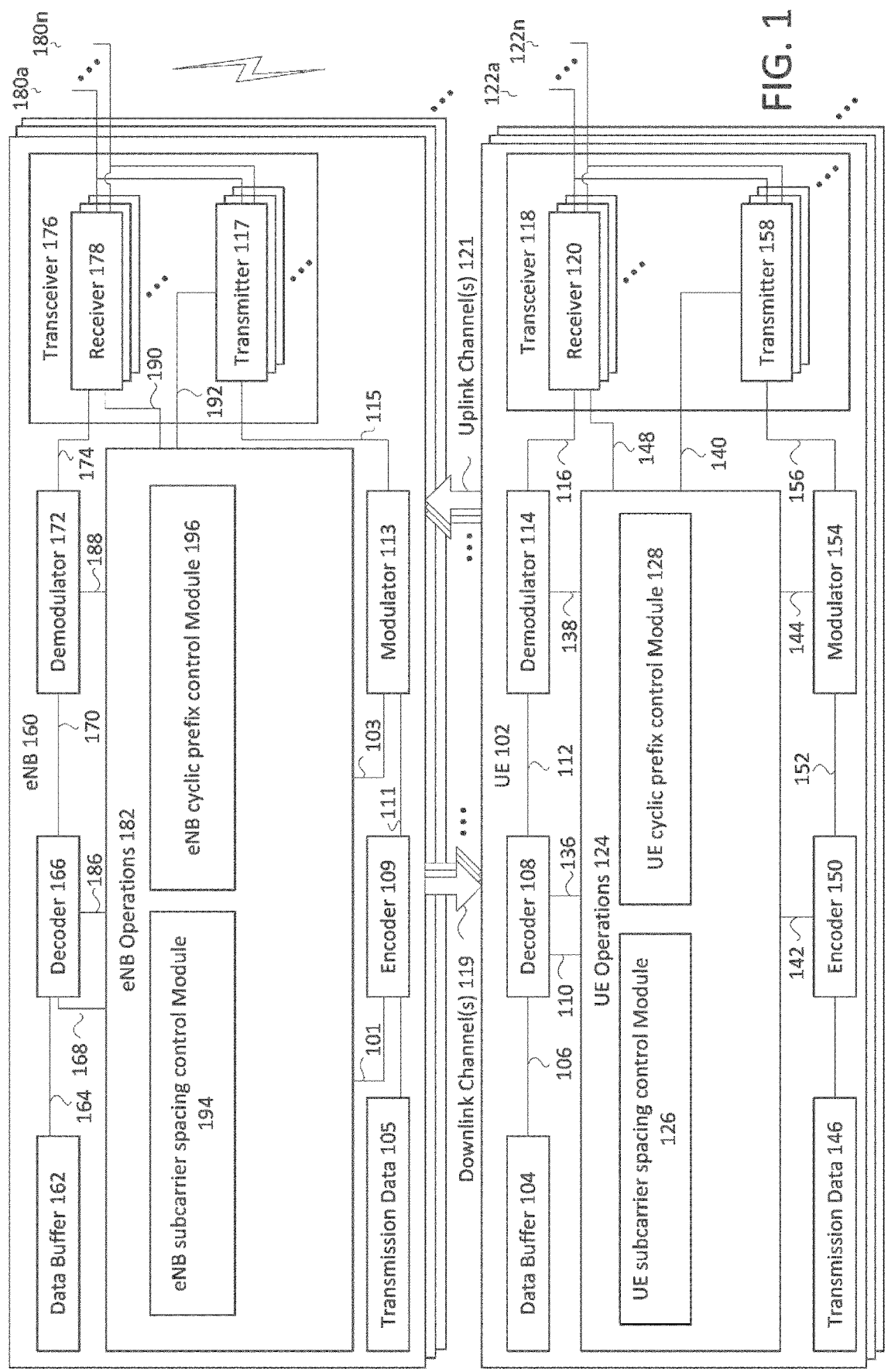
FIG. 1 is a block diagram illustrating one configuration of one or more evolved Node Bs (eNBs) and one or more user equipments (UEs) in which systems and methods for multi-physical structure system may be implemented.

A method by a user equipment (UE) is described. The method includes receiving a first physical signal, determining a first physical structure based on information in the first physical signal, and determining resource elements based on the first physical structure. The physical structure includes resource elements. The resource elements are identified by indices of subcarriers in frequency and indices of orthogonal frequency-division multiplexing (OFDM) symbols in time domains. OFDM symbols using a first cyclic prefix length in a first set of subcarriers are mapped such that in addition to a slot boundary one or more of starting positions or ending positions of OFDM symbols using a first cyclic prefix length in a first set of subcarriers are aligned with one or more of starting positions or ending positions of OFDM symbols using a second cyclic prefix length in a second set of subcarriers which are used for a different physical structure than the first physical structure.

A method by an evolved Node B (eNB) is described. The method includes determining a first physical structure, mapping signals to resource elements according to the first physical structure. The physical structure includes resource elements. The resource elements are identified by indices of subcarriers in frequency and indices of orthogonal frequency-division multiplexing (OFDM) symbols in time domains. OFDM symbols using a first cyclic prefix length in a first set of subcarriers are mapped such that in addition to a slot boundary one or more of starting positions or ending positions of OFDM symbols using a first cyclic prefix length in a first set of subcarriers are aligned with one or more of starting positions or ending positions of OFDM symbols using a second cyclic prefix length in a second set of subcarriers which are used for a different physical structure than the first physical structure.

A user equipment (UE) is described. The UE includes a processor and memory in electronic communication with the processor. Instructions stored in the memory are executable to receive a first physical signal, determine a first physical structure based on information in the first physical signal, and determine resource elements based on the first physical structure. The physical structure includes resource elements. The resource elements are identified by indices of subcarriers in frequency and indices of orthogonal frequency-division multiplexing (OFDM) symbols in time domains. OFDM symbols using a first cyclic prefix length in a first set of subcarriers are mapped such that in addition to a slot boundary one or more of starting positions or ending positions of OFDM symbols using a first cyclic prefix length in a first set of subcarriers are aligned with one or more of starting positions or ending positions of OFDM symbols using a second cyclic prefix length in a second set of subcarriers which are used for a different physical structure than the first physical structure.

An evolved Node B (eNB) is described. The eNB includes a processor and memory in electronic communication with the processor. Instructions stored in the memory are executable to determine a first physical structure, and map signals to resource elements according to the first physical structure. The physical structure includes resource elements. The resource elements are identified by indices of subcarriers in frequency and indices of orthogonal frequency-division multiplexing (OFDM) symbols in time domains. OFDM symbols using a first cyclic prefix length in a first set of subcarriers are mapped such that in addition to a slot boundary one or more of starting positions or ending positions of OFDM symbols using a first cyclic prefix length in a first set of subcarriers are aligned with one or more of starting positions or ending positions of OFDM symbols using a second cyclic prefix length in a second set of subcarriers which are used for a different physical structure than the first physical structure.

Another method by a user equipment (UE) is described. The method includes receiving a first physical signal, determining a first physical structure based on information in the first physical signal, and determining resource elements based on the first physical structure. The physical structure includes resource elements. The resource elements are identified by indices of subcarriers in frequency and indices of orthogonal frequency-division multiplexing (OFDM) symbols in time domains. A first set of subcarriers with first subcarrier spacing which is integer multiple or integer sub-multiple of second subcarrier spacing are mapped such that in addition to a resource block boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols. A cyclic prefix length for the first subcarrier spacing is defined such that OFDM symbols are aligned in time domain in at least one or more of starting positions or ending positions of OFDM symbols between subcarriers with the first subcarrier spacing and subcarriers with the second subcarrier spacing.

Another method by an evolved Node B (eNB) is described. The method includes determining a first physical structure, and mapping signals to resource elements according to the first physical structure. The physical structure includes resource elements. The resource elements are identified by indices of subcarriers in frequency and indices of orthogonal frequency-division multiplexing (OFDM) symbols in time domains. A first set of subcarriers with first subcarrier spacing which is integer multiple or integer sub-multiple of second subcarrier spacing are mapped such that in addition to a resource block boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols. A cyclic prefix length for the first subcarrier spacing is defined such that OFDM symbols are aligned in time domain in at least one or more of starting positions or ending positions of OFDM symbols between subcarriers with the first subcarrier spacing and subcarriers with the second subcarrier spacing.

Another user equipment (UE) is described. The UE includes a processor and memory in electronic communication with the processor. Instructions stored in the memory are executable to receive a first physical signal, determine a first physical structure based on information in the first physical signal, and determine resource elements based on the first physical structure. The physical structure includes resource elements. The resource elements are identified by indices of subcarriers in frequency and indices of orthogonal frequency-division multiplexing (OFDM) symbols in time domains. A first set of subcarriers with first subcarrier spacing which is integer multiple or integer sub-multiple of second subcarrier spacing are mapped such that in addition to a resource block boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols. A cyclic prefix length for the first subcarrier spacing is defined such that OFDM symbols are aligned in time domain in at least one or more of starting positions or ending positions of OFDM symbols between subcarriers with the first subcarrier spacing and subcarriers with the second subcarrier spacing.

Another evolved Node B (eNB) is described. The eNB includes a processor and memory in electronic communication with the processor. Instructions stored in the memory are executable to determine a first physical structure, and map signals to resource elements according to the first physical structure. The physical structure includes resource elements. The resource elements are identified by indices of subcarriers in frequency and indices of orthogonal frequency-division multiplexing (OFDM) symbols in time domains. A first set of subcarriers with first subcarrier spacing which is integer multiple or integer sub-multiple of second subcarrier spacing are mapped such that in addition to a resource block boundary one or more of starting positions or ending positions of first subcarriers with the first subcarrier spacing in a first set of OFDM symbols are aligned with one or more of starting positions or ending positions of second subcarriers with the second subcarrier spacing in a second set of OFDM symbols. A cyclic prefix length for the first subcarrier spacing is defined such that OFDM symbols are aligned in time domain in at least one or more of starting positions or ending positions of OFDM symbols between subcarriers with the first subcarrier spacing and subcarriers with the second subcarrier spacing.

Yet another method by a user equipment (UE) is described. The method includes receiving a first physical signal, determining first subcarrier spacing based on information in the first physical signal, and determining resource elements based on the first subcarrier spacing. The resource elements are identified by indices of subcarriers in frequency and indices of orthogonal frequency-division multiplexing (OFDM) symbols in time domains. The resource elements are mapped based on either the first subcarrier spacing or second subcarrier spacing.

Yet another method by an evolved Node B (eNB) is described. The method includes determining first subcarrier spacing, and mapping signals to resource elements according to the first subcarrier spacing. The resource elements are identified by indices of subcarriers in frequency and indices of orthogonal frequency-division multiplexing (OFDM) symbols in time domains. The resource elements are mapped based on either the first subcarrier spacing or second subcarrier spacing.

Yet another user equipment (UE). The UE includes a processor and memory in electronic communication with the processor. Instructions stored in the memory are executable to receive a first physical signal, determine first subcarrier spacing based on information in the first physical signal, and determine resource elements based on the first subcarrier spacing. The resource elements are identified by indices of subcarriers in frequency and indices of orthogonal frequency-division multiplexing (OFDM) symbols in time domains. The resource elements are mapped based on either the first subcarrier spacing or second subcarrier spacing.

Yet another evolved Node B (eNB) is described. The eNB includes a processor and memory in electronic communication with the processor. Instructions stored in the memory are executable to determine first subcarrier spacing, and map signals to resource elements according to the first subcarrier spacing. The resource elements are identified by indices of subcarriers in frequency and indices of orthogonal frequency-division multiplexing (OFDM) symbols in time domains. The resource elements are mapped based on either the first subcarrier spacing or second subcarrier spacing.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12 and/or 13). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and EUTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDCCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB. However, in a small cell deployment scenario, each node (e.g., eNB, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

Instead of having lots of features in a UE, the system and method described herein may enhance the accommodation of UEs with new type or new category which have limited features (e.g. specific UEs). Especially, such UEs may be efficient for Machine-Type Communications (MTC), but it is noted that it is not limited to MTC use case. The provision of Machine-Type Communications (MTC) via cellular networks is proving to be a significant opportunity for new revenue generation for mobile operators. "Low cost & enhanced coverage MTC UE for LTE" in Release 12 specified a low complexity LTE device for MTC with Bill of Material cost approaching that of an Enhanced General Packet Radio Service (EGPRS) modem using a combination of complexity reduction techniques. However, results from the study indicated that further complexity reduction of LTE devices for MTC can be achieved if additional complexity reduction techniques are supported.

In addition, the study in Release 12 concluded that a coverage improvement target of 15-20 dB for both Frequency Division Duplex (FDD) and Time Division Duplex (TDD) in comparison to normal LTE footprint could be achieved to support the use cases where MTC devices are deployed in challenging locations, e.g. deep inside buildings, and to compensate for gain loss caused by complexity reduction techniques.

The general objective is to specify a new UE in LTE that also allows for enhanced coverage compared to existing LTE networks and low power consumption, with the following detailed objectives. It may be to specify a new low complexity UE category/type for MTC operation in any LTE duplex mode (full duplex FDD, half duplex FDD, TDD) based on the Rel-12 low complexity UE category/type supporting the following additional capabilities. It may be to reduced UE bandwidth of 1.4 MHz (i.e., 6 Physical Resource Blocks (PRBs)) in downlink and uplink. It may be a bandwidth reduced UEs should be able to operate within any system bandwidth. It may be frequency multiplexing of bandwidth reduced UEs and non-MTC UEs should be supported. It may be that the UE only needs to support 1.4 MHz RF (radio frequency) bandwidth in downlink and uplink. The present disclosure relates especially to how low complexity, bandwidth reduced and/or coverage enhanced UEs (e.g, specific UEs, MTC UEs) can be accommodated in current and future LTE system.

As described in RP-151621, the discussion on Narrowband-IOT (Internet of Things) (NB-IoT) in Release 13 was started. The aim was to study both the possibility of evolving current GERAN (GSM (global system for mobile communications) EDGE Radio Access Network) system and the design of a new access system towards low complexity and low throughput radio access technology to address the requirements of cellular internet of things. The objectives of the study (i.e., evaluation before a work) were: improved indoor coverage, support for massive number of low throughput devices, low delay sensitivity, ultra-low device cost, low device power consumption and (optimized) network architecture. The objective of the work of NB-IoT is to specify a radio access for cellular internet of things, based to a great extent on a non-backward-compatible variant of E-UTRA, that addresses improved indoor coverage, support for massive number of low throughput devices, low delay sensitivity, ultra low device cost, low device power consumption and (optimized) network architecture. NB-IoT may support 3 different modes of operation:

1. 'Stand-alone operation' utilizing for example the spectrum currently being used by GERAN systems as a replacement of one or more GSM carriers, 2. 'Guard band operation' utilizing the unused resource blocks within a LTE carrier's guard-band, 3. In-band operation utilizing resource blocks within a normal LTE carrier.

In particular, the following may be supported:

(i) 180 kHz UE RF bandwidth for both downlink and uplink, (ii) OFDMA on the downlink, Two numerology options may be considered for inclusion: 15 kHz sub-carrier spacing (with normal or extended CP) and 3.75 kHz sub-carrier spacing.

(iii) A single synchronization signal design for the different modes of operation, including techniques to handle overlap with legacy LTE signals, (iv) MAC, RLC, PDCP and RRC procedures based on existing LTE procedures and protocols and relevant optimizations to support the selected physical layer.

This NB-IoT system may introduce various numerologies (e.g., subcarrier spacing, symbol times, and Fast Fourier Transform (FFT) size). One of 5th generation (5G) cellular system may target on accommodating such various numerologies in one system to achieve various type of data, services or traffic, etc. Hereafter, although a term "NB-IoT" system is used, it may include various types of systems that accommodate various types of physical structures (e.g., radio access network (RAN) slicing).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for accommodating specific UEs may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a secondary synchronization signal (SSS), a cell-specific reference signal (CRS), and a channel state information (CSI) reference signal (CSI-RS), etc. Other kinds of channels or signals may be used.

The size of various fields in the time domain may be expressed as a number of time units $T_s=1/(15000 \times 2048)$ seconds. Downlink, uplink and sidelink transmissions are organized into radio frames with $T_f=307200 \times T_s=10$ ms duration in LTE. Two radio frame structures may supported: Type 1, applicable to LTE FDD, Type 2, applicable to LTE TDD. Frame structure type 1 may be applicable to both full duplex and half duplex FDD. Each radio frame is $T_f=307200 \times T_s=10$ ms long and consists of 20 slots of length $T_{slot}=15360 \times T_s=0.5$ ms, numbered from 0 to 19. A subframe may be defined as two consecutive slots where subframe i consists of slots $2^i$ and $2^{i+1}$. For frame structure type 2, each radio frame of length $T_f=307200 \times T_s=10$ ms may consist of two half-frames of length $153600 \times T_s=5$ ms each. Each half-frame may consist of five subframes of length $30720 \times T_s=1$ ms. Each subframe i may be defined as two slots, $2^i$ and $2^{i+1}$, of length $T_{slot}=15360 \times T_s=0.5$ ms each.

For NB-IoT, the frame structures (Frame structure type 3 for NB-IoT FDD, Frame structure type 4 for NB-IoT TDD) may be different from LTE. In a certain case, even for NB-IoT, the frame structure may be the same with LTE (e.g., in a case of in-band operation). For an example for NB-IoT FDD frame structures different from LTE, given a number of time units $T_s=1/(15000 \times 2048)$ seconds, each radio frame is $T_f=1228800 \times T_s=40$ ms long and consists of 20 slots of length $T_{slot}=61440 \times T_s=2.0$ ms, numbered from 0 to 19. For another example, each radio frame is $T_f=1228800 \times T_s=40$ ms long and consists of 80 slots of length $T_{slot}=1536 \times T_s=0.5$ ms, numbered from 0 to 79. A subframe may be defined as two consecutive slots where subframe i consists of slots $2^i$ and $2^{i+1}$. Alternatively, a subframe may be defined as eight consecutive slots where subframe i consists of slots 8i and 8i+1. For another example, given a number of time units $T_s=1/(15000 \times 512)$ seconds, each radio frame is $T_f=307200 \times T_s=40$ ms long and consists of 20 slots of length $T_{slot}=15360 \times T_s=2.0$ ms, numbered from 0 to 19. For another example, each radio frame is $T_f=307200 \times T_s=40$ ms long and consists of 80 slots of length $T_{slot}=384 \times T_s=0.5$ ms, numbered from 0 to 79. A subframe may be defined as two consecutive slots where subframe i consists of slots $2^i$ and $2^{i+1}$. Alternatively, a subframe may be defined as eight consecutive slots where subframe i consists of slots 8i and 8i+1. For an example for NB-IoT TDD frame structures, given a number of time units $T_s=1/(15000 \times 2048)$ seconds, each radio frame of length $T_f=1228800 \times T_s=40$ ms may consist of two half-frames of length $307200 \times T_s=5$ ms each. As above, for a system (e.g., NB-IoT), various types of numerology may be considered. However, considering support of integer multiple or integer sub-multiple of subcarrier spacing 15 kHz, some values are also integer of multiple or integer sub-multiple of corresponding LTE values. A length of radio frame, subframe, and/or slot may be 4 or 8 times of a length of LTE radio frame, subframe, and/or slot, respectively.

The transmitted signal in each slot may be described by one or several resource grids of $$N_{RB}^{DL} N_{sc}^{RB}$$

subcarriers and $$N_{symb}^{DL}$$

orthogonal frequency-division multiplexing (OFDM) symbols, wherein $$N_{symb}^{DL}$$

is a number of OFDM symbols in a downlink slot (e.g., a number of SC-FDMA (Single-Carrier Frequency Division Multiple Access) symbols in a uplink slot), $$N_{RB}^{DL}$$

is a downlink bandwidth configuration, expressed in multiples of $$N_{sc}^{RB},$$

$$n_{PRB}$$

is a physical resource block number, and $$N_{sc}^{RB}$$

is a resource block size in the frequency domain, expressed as a number of subcarriers.

Figure 6:
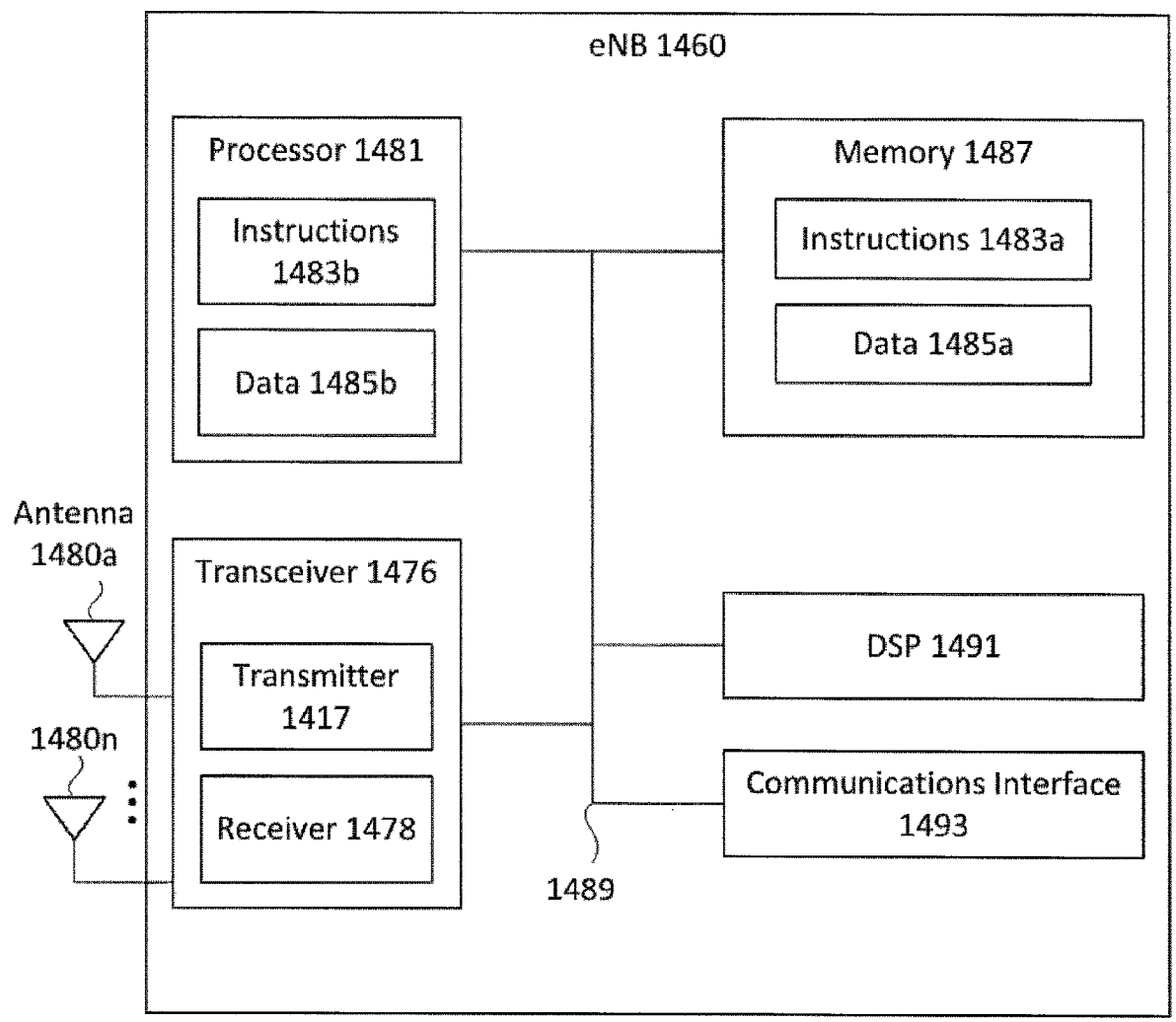
FIG. 6 illustrates various components that may be utilized in an eNB.

The resource grid structure may be illustrated in FIG. 6.2.2-1 in 3GPP TS 36.211. The quantity $$N_{RB}^{DL}$$

depends on the downlink transmission bandwidth configured in the cell and shall fulfill:

$$N_{RB}^{min,DL} \leq N_{RB}^{DL} \leq N_{RB}^{max,DL}$$

where $$N_{RB}^{min,DL} = 6$$

and $$N_{RB}^{max,DL} = 110$$

may be the smallest and largest downlink bandwidths in LTE 180 kHz bandwidth RB (resource block), wherein $$N_{RB}^{min,DL}$$

is a smallest downlink bandwidth configuration, expressed in multiples of $$N_{sc}^{RB},$$

and $$N_{RB}^{max,DL}$$

is a largest downlink bandwidth configuration, expressed in multiples of $$N_{sc}^{RB}.$$

The set of allowed values for $$N_{RB}^{DL}$$

may be given by 3GPP TS 36.104. The number of OFDM symbols in a slot may depend on the cyclic prefix (CP) length and subcarrier spacing $$\Delta f$$

configured and may be given in Table 1 (from Table 6.2.3-1 in 3GPP TS 36.211).

An antenna port may be defined such that the channel over which a symbol on the antenna port is conveyed can be inferred from the channel over which another symbol on the same antenna port is conveyed. There may be one resource grid per antenna port. The set of antenna ports supported may depend on the reference signal configuration in the cell. Two antenna ports may be said to be quasi co-located if the large-scale properties of the channel over which a symbol on one antenna port is conveyed can be inferred from the channel over which a symbol on the other antenna port is conveyed. The large-scale properties may include one or more of delay spread, Doppler spread, Doppler shift, average gain, and average delay.

Each element in the resource grid for antenna port p may be called a resource element and may be uniquely identified by the index pair (k, l) in a slot where $$k = 0, \ldots, N_{RB}^{DL} N_{sc}^{RB} - 1$$

and $$l = 0, \ldots, N_{symb}^{DL} - 1$$

are the indices in the frequency and time domains, respectively. Resource element (k, l) on antenna port p may correspond to the complex value $$a_{k,l}^{(p)}.$$

When there is no risk for confusion, or no particular antenna port is specified, the index p may be dropped.

Resource blocks may be used to describe the mapping of certain physical channels to resource elements. Physical and virtual resource blocks may be defined.

A physical resource block may be defined as $$N_{symb}^{DL}$$

consecutive OFDM symbols in the time domain and $$N_{sc}^{RB}$$

consecutive subcarriers in the frequency domain, where $$N_{symb}^{DL}$$

and $$N_{sc}^{RB}$$

are given by in Table 1 (from Table 6.2.3-1 in 3GPP TS 36.211). A physical resource block thus consists of $$N_{symb}^{DL} \times N_{sc}^{RB}$$

resource elements, corresponding to one slot in the time domain and 180 kHz in the frequency domain in LTE.

TABLE 1

Physical resource blocks parameters for LTE

| Configuration | | $N_{sc}^{RB}$ | $N_{symb}^{DL}$ |
|---|---|---|---|
| Normal cyclic prefix | $\Delta f$ = 15 kHz | 12 | 7 |
| Extended cyclic prefix | $\Delta f$ = 15 kHz | | 6 |
| | $\Delta f$ = 7.5 kHz | 24 | 3 |

For a system (e.g., NB-IoT system), it may be $N_{RB}^{min,DL}=1$ and $N_{RB}^{max,DL}=1$ (e.g., if $N_{sc}^{RB}$ and $N_{symb}^{DL}$ are defined in Table 1). Depending on definition of minimum scheduling frequency bandwidth unit, RB with less than 180 kHz bandwidth may be defined for NB-IoT. For example, in Table 2, physical resource blocks parameters for NB-IoT in 0.5 ms slot are shown. If $N_{sc}^{RB}=48$ and $\Delta f=3.75$ kHz, one RB has 180 kHz bandwidth. If $N_{sc}^{RB}=12$ and $\Delta f=3.75$ kHz, one RB has 45 kHz bandwidth. Therefore, it may be $N_{RB}^{min,DL}=4$ and $N_{RB}^{max,DL}=4$.

For another example, in Table 3, physical resource blocks parameters for NB-IoT in 2.0 ms slot are shown.

TABLE 2

Physical resource blocks parameters for NB-IoT in 0.5 ms slot

| Configuration | | $N_{sc}^{RB}$ | (Option 2)$N_{sc}^{RB}$ | $N_{symb}^{DL}$ |
|---|---|---|---|---|
| Normal cyclic prefix | Δf = 3.75 kHz | 48 | 12 | 3 |
| | Δf = 15 kHz | 12 | 12 | 7 |
| Extended cyclic prefix | Δf = 15 kHz | | | 6 |
| | Δf = 7.5 kHz | 24 | 12 | 3 |
| | Δf = 3.75 kHz | 48 | 12 | 1 |

TABLE 3

Physical resource blocks parameters for NS-IoT in 2.0 ms slot

| Configuration | | $N_{sc}^{RB}$ | (Option 2)$N_{sc}^{RB}$ | $N_{symb}^{DL}$ |
|---|---|---|---|---|
| Normal cyclic prefix | Δf = 3.75 kHz | 48 | 12 | 7 |
| | Δf = 15 kHz | 12 | 12 | 28 |
| Extended cyclic prefix | Δf = 15 kliz | | | 24 |
| | Δf = 7.5 kHz | 24 | 12 | 12 |
| | Δf = 3.75 kHz | 48 | 12 | 6 |

Configurations in Table 1, 2, 3, 4 and 5 (Table 4 and 5 are described later) may be configurable in a system. Therefore, at some points, the system may indicate one or more (may be referred to as first indication(s)) of $\Delta f, N_{sc}^{RB}, N_{symb}^{DL}$, the number of consecutive slots in a subframe, and/or cyclic prefix, explicitly or implicitly. In implicit method, the eNB may send a first physical signal which is used for the UE to identify $\Delta f, N_{sc}^{RB}, N_{symb}^{DL}$, the number of consecutive slots in a subframe, and/or cyclic prefix for the first physical signal and/or for a second physical signal.

Physical resource blocks may be numbered from 0 to $N_{RB}^{DL}-1$ in the frequency domain. The relation between the physical resource block number $n_{PRB}$ in the frequency domain and resource elements (k, l) in a slot may be given by $$n_{PRB} = \left\lfloor \frac{k}{N_{sc}^{RB}} \right\rfloor$$

A physical resource-block pair may be defined as the X physical resource blocks in one subframe having the same physical resource-block number $n_{PRB}$, wherein X is the number of consecutive slots in a subframe.

The time-continuous signal $s_l^{(p)}(t)$ on antenna port p in OFDM symbol l in a downlink slot may be defined by $$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lceil N_{RB}^{DL} N_{sc}^{RB}/2 \rceil} a_{k^{(+)},l}^{(p)} \cdot e^{j2\pi k \Delta f(t-N_{CP,l}T_s)}$$

for $0 \le t < (N_{CP,l}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$.

The variable N may equal 2048 for $\Delta f=15$ kHz subcarrier spacing, 4096 for $\Delta f=7.5$ kHz subcarrier spacing, and 8192 (for 180 kHz bandwidth capable UE and/or 180 kHz system bandwidth, this may be 64, 128 which may represent supported FFT size) for $\Delta f=3.75$ kHz.

The OFDM symbols in a slot may be transmitted in increasing order of l, starting with l=0, where OFDM symbol l>0 starts at time $$\Sigma_{l'=0}^{l-1}(N_{CP,l'}+N)T_s$$

within the slot. In case the first OFDM symbol(s) in a slot use normal cyclic prefix and the remaining OFDM symbols use extended cyclic prefix, the starting position the OFDM symbols with extended cyclic prefix may be identical to those in a slot where all OFDM symbols use extended cyclic prefix. Thus there may be a part of the time slot between the two cyclic prefix regions where the transmitted signal is not specified. In case the first OFDM symbol(s) in a slot use normal cyclic prefix, the remaining OFDM symbols in a part of all resource blocks in system bandwidth in the slot use extended cyclic prefix and the remaining OFDM symbols in other resource blocks in the slot use normal cyclic prefix (e.g. in time overlapping with different cyclic prefix lengths), the starting position the OFDM symbols with extended cyclic prefix may be different to those in a slot where all OFDM symbols use extended cyclic prefix. This may happen because a number of OFDM symbols boundaries which are time aligned between the part of all resource blocks and other resource blocks may be used.

Table 4 (from Table 6.12-1 in 3GPP TS36.211) lists the value of $$N_{CP,l}$$

(downlink cyclic prefix length for OFDM symbol l in a slot) that may be used, given $T_s=1/(15000\times 2048)$. It is noted that different OFDM symbols within a slot in some cases have different cyclic prefix lengths. Table 5 lists the value of $$N_{CP,l}$$

that may be used for a system (e.g., NB-IoT system) including $$\Delta f=3.75 \text{ kHz},$$

given $T_s=1/(15000\times 2048)$. The values may be different depending on $T_s$.

TABLE 4

OFDM parameters in $T_s = 1/(15000 \times 2048)$

| Configuration | | Cyclic prefix length $N_{CP,l}$ |
|---|---|---|
| Normal cyclic prefix | Δf = 15 kHz | 160 for l = 0 |
| | | 144 for l = 1, 2, . . . , 6 |
| Extended cyclic prefix | Δf = 15 kHz | 512 for l = 0, 1, . . . , 5 |
| | Δf = 7.5 kHz | 1024 for l = 0, 1, 2 |

TABLE 5

OFDM parameters in $T_s = 1/(15000 \times 2048)$ including Δf = 3.75 kHz

| Configuration | | Cyclic prefix length $N_{CP,l}$ |
|---|---|---|
| Normal cyclic prefix | Δf = 3.75 kHz | 640 for l = 0 |
| | | 576 for l > 0 |
| | Δf = 15 kHz | 160 for l = 0 |
| | | 144 for l > 0 |
| Extended cyclic prefix | Δf = 15 kHz | 512 |
| | Δf = 7.5 kHz | 1024 |
| | Δf = 3.75 kHz | 2048 |

For a system (e.g., NB-IoT system), to accommodate multiple subcarrier spacing resource elements, it may be beneficial that cyclic prefix length for narrower subcarrier spacing is used for adjusting a time boundary of OFDM symbol such that OFDM symbols are aligned in time domain in at least one or more of starting points (e.g., starting positions) or ending points (e.g., ending positions) of OFDM symbols among subcarriers with different subcarrier spacing.

In some configurations, in a case of including different CP length with the same subcarrier spacing or different subcarrier spacing in one or more resource block or in neighbor resource blocks, it may be complicated to avoid any interference to all resource elements. However, in some patterns, it may be possible to reduce such interference by increasing the number of time aligned boundaries in those resource blocks.

The reference-signal sequence $$r_{l,n_s}(m)$$

for cell-specific reference signals (CRS) may be defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, 2, \ldots, 2N_{RB}^{max,DL} - 1$$

where $$n_s$$

is the slot number within a radio frame and l is the OFDM symbol number within the slot. The pseudo-random sequence c() may be defined (in clause 7.2 in 3GPP TS 36.211). The pseudo-random sequence generator may be initialized with $$c_{init}=2^{10} \cdot (7 \cdot (n_s+1)+l+1) \cdot (2 \cdot N_{ID}^{cell}+1)+2 \cdot N_{ID}^{cell}+N_{CP}$$

at the start of each OFDM symbol where $$N_{CP} = \begin{cases} 1 & \text{for normal } CP \\ 0 & \text{for extended } CP \end{cases}$$

The reference signal sequence $$r_{l,n_s}(m)$$

for cell-specific reference signals (CRS) may be mapped to complex-valued modulation symbols $$a_{k,l}^{(p)}$$

used as reference symbols for antenna port p in slot $$n_s$$

according to $$a_{k,l}^{(p)} = r_{l,n_s}(m')$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

-continued $$m = 0, 1, \ldots, 2 \cdot N_{RB}^{DL} - 1$$

$$m' = m + N_{RB}^{max,DL} - N_{RB}^{DL}.$$

The variables $v$ and $v_{shift}$ define the position in the frequency domain for the different reference signals where $v$ is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift may be given by $$v_{shift} = N_{ID}^{cell} \bmod 6$$

Resource elements (k, l) used for transmission of cell-specific reference signals on any of the antenna ports in a slot may not be used for any transmission on any other antenna port in the same slot and set to zero.

In an MBSFN subframe, cell-specific reference signals may only be transmitted in the non-MBSFN region of the MBSFN subframe.

FIGS. 6.10.1.2-1 and 6.10.1.2-2 in 3GPP TS 36.211 illustrate examples of the resource elements used for reference signal transmission according to the above definition. Similarly, FIG. 4a-e illustrates examples of the resource elements. The notation Rp is used to denote a resource element used for reference signal transmission on antenna port p.

There may be 504 unique physical-layer cell identities. The physical-layer cell identities may be grouped into 168 unique physical-layer cell-identity groups, each group containing three unique identities. The grouping may be such that each physical-layer cell identity is part of one and only one physical-layer cell-identity group. A physical-layer cell identity $$N_{ID}^{cell} = 3N_{ID}^{(1)} + N_{ID}^{(2)}$$

may be thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

As mentioned above, at some points, the system may indicate one or more of $\Delta f, N_{sc}^{RB}, N_{symb}^{DL},$ the number of consecutive slots in a subframe, and/or cyclic prefix, explicitly or implicitly. One possible implementation is using the physical-layer identity for such indications or indexes (may be referred to as first indication(s)) indicative of one or more of whether $\Delta f$ is a value A, a value B, and so on, whether $N_{sc}^{RB}$ is a value C, a value D, and so on, and whether $N_{symb}^{DL}$ is a value E, a value F, and so on, whether the number of consecutive slots in a subframe is a value G, a value H, and so on, and whether cyclic prefix length is a value I or a value J, and so on. Currently the physical-layer cell-identity group information is included in a primary synchronization signal and the physical-layer identity within the physical-layer cell-identity group is included in a secondary synchronization signal. Therefore, either or both of the physical-layer cell-identity group information and the physical-layer identity within the physical-layer cell-identity group may include the first indication(s). In other word, one or more of a synchronization signal, a primary synchronization signal and a secondary synchronization signal may be used to identify the first indication(s). One or more of a synchronization signal, a primary synchronization signal and a secondary synchronization signal may be generated by the same parameters with or different parameters than parameters indicated by the first indication(s).

In some configurations, the primary synchronization signal may be detectable signal by a UE with assumptions of different cyclic prefix length and/or different subcarrier spacing. The secondary synchronization signal may not be detectable signal by a UE with different assumptions cyclic prefix length and/or subcarrier spacing than actual cyclic prefix and/or actual subcarrier spacing of the secondary synchronization signal. Therefore, by detecting the secondary synchronization signal, the UE may identity the cyclic prefix length and/or subcarrier spacing for the synchronization signal and other physical layer signals and channels.

In some configurations, in a case of including different CP length with the same subcarrier spacing or different subcarrier spacing in one or more resource block or in neighbor resource blocks, it is beneficial to avoid any interference to all resource elements mapped to cell-specific reference signals (CRS) because the CRS is used by legacy UEs to estimate LTE channels.

Figure 4A:
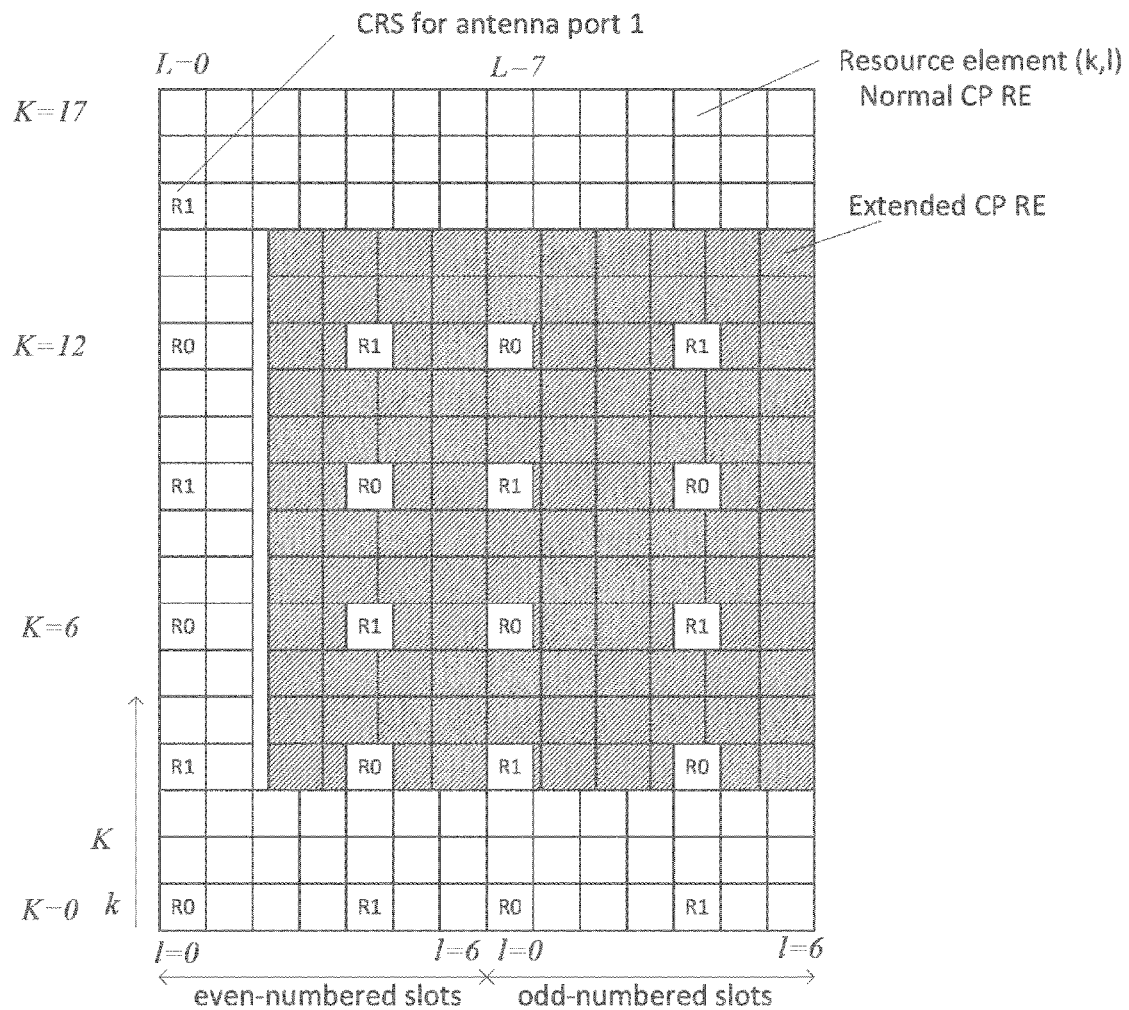
FIG. 4a is diagrams illustrating examples for a resource element mapping illustrating configuration of resource blocks.

FIG. 4a is an example of a resource element mapping illustrating one configuration of resource blocks including subcarriers different cyclic prefix length. In this figure, (K, L) indicates resource element (k, l). In this example, Resource elements with extended cyclic prefix are located where (K, L)=(x, y), x=3, 4, . . . , 14, y=2, 3, . . . , 13. In this case, REs for CRS for normal CP within area occupied by extended CP REs are not protected and affected by interference from extended CP.

Figure 4B:
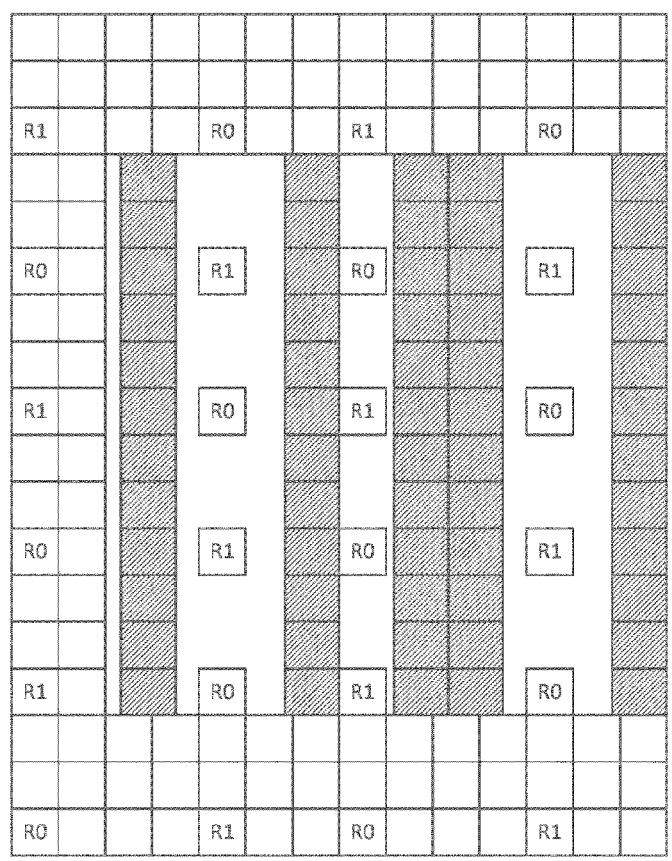
FIG. 4b is diagrams illustrating examples for a resource element mapping illustrating configuration of resource blocks.

FIG. 4b is an example of a resource element mapping illustrating another configuration of resource blocks including subcarriers different cyclic prefix length. In this case, REs for CRS for normal CP within area occupied by extended CP REs are protected because OFDM symbols overlapping with CRS are punctured.

Figure 4C:
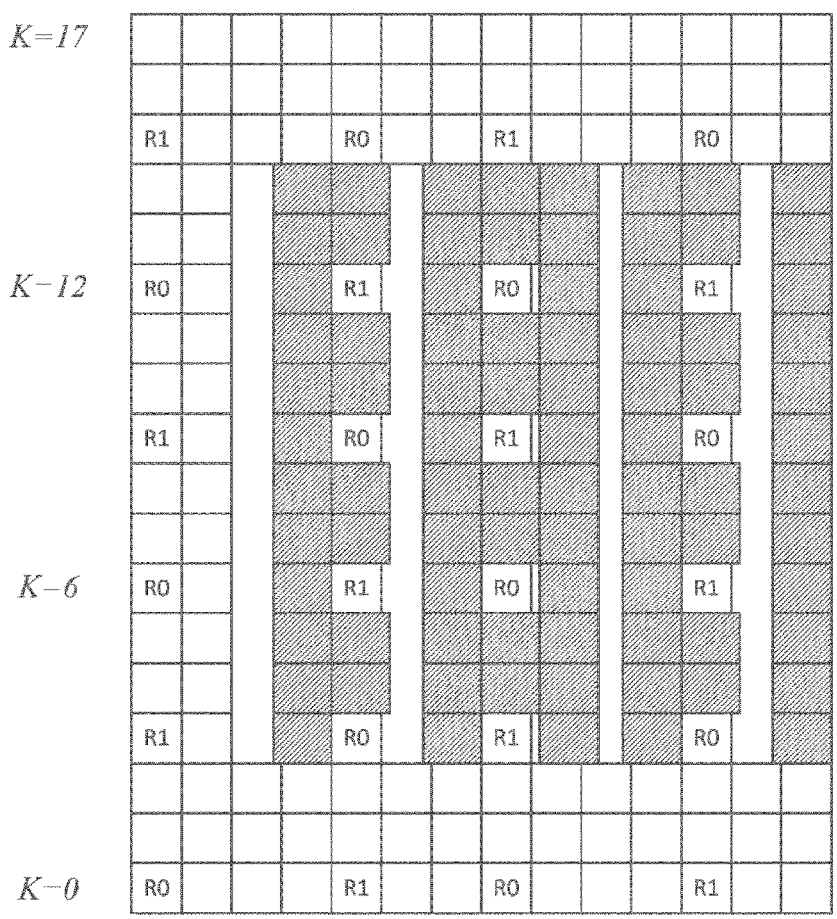
FIG. 4c is diagrams illustrating examples for a resource element mapping illustrating configuration of resource blocks.

FIG. 4c is an example of a resource element mapping illustrating yet another configuration of resource blocks including subcarriers different cyclic prefix length. In this case, REs for CRS for normal CP within area occupied by extended CP REs are protected because a time boundary of OFDM symbols for extended CP such that OFDM symbols are aligned in time domain in at least one or more of starting points (e.g., starting positions) or ending points (e.g., starting positions) of OFDM symbols with different cyclic prefix in addition to slot boundaries.

Figure 4D:
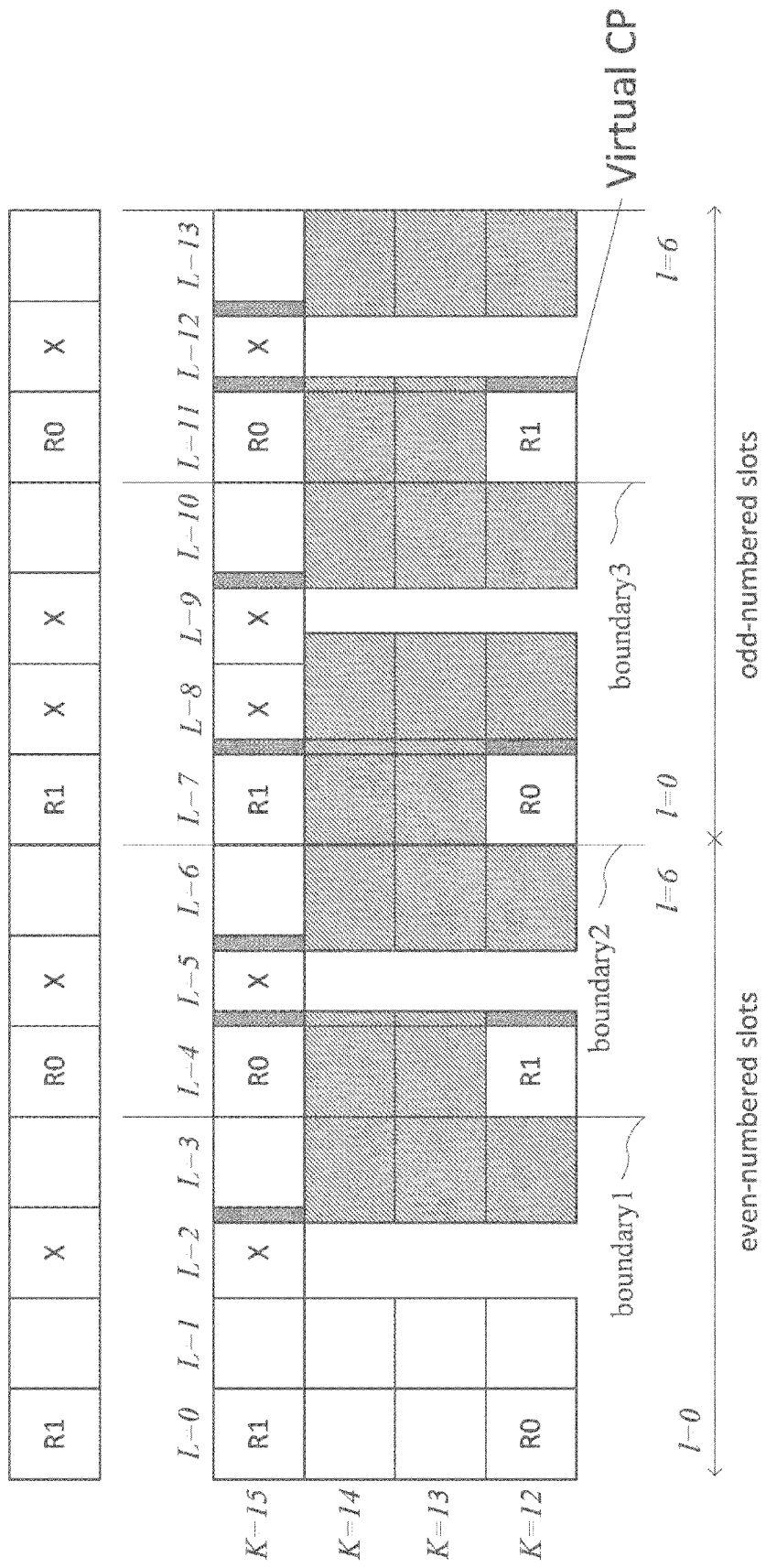
FIG. 4d is diagrams illustrating examples for a resource element mapping illustrating configuration of resource blocks.

FIG. 4d is some details of FIG. 4c. Boundaries in-between L=3 and L=4, L=6 and L=7, and L=10 and L=11 are aligned between normal CP OFDM symbol and extended CP OFDM symbol. To mitigate interference each other, OFDM symbols, where L=2, 5, 8, 9, 12, of normal CP are punctured as immunity OFDM symbols to accommodate different numerology while some OFDM symbols are time aligned. By this immunity OFDM symbols, interference can be mitigated. Also, some virtual CP may be added at a head or tail of OFDM symbol to reduce non-time aligned OFDM symbols.

Figure 4E:
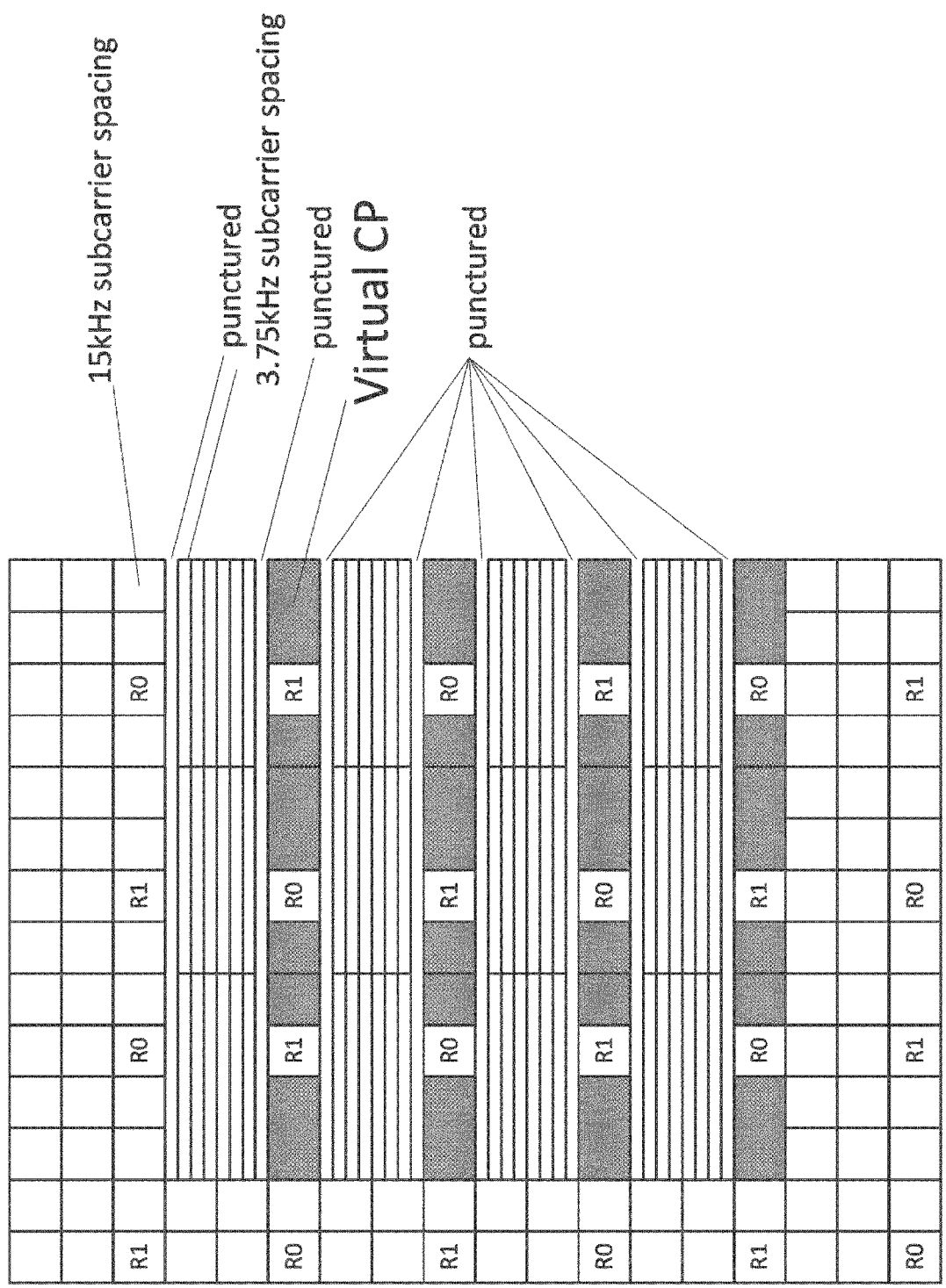
FIG. 4e is diagrams illustrating examples for a resource element mapping illustrating configuration of resource blocks.

FIG. 4e is an example of a resource element mapping illustrating yet another configuration of resource blocks including subcarriers different subcarrier spacing. In this case, interference to REs for CRS for 15 kHz subcarrier spacing within area occupied by 3.75 kHz subcarrier spacing REs are somewhat mitigated by adding appropriate cyclic prefix length to align at least one or more of starting points (e.g., starting positions) or ending points (e.g., ending positions) of OFDM symbols in time domain. This cyclic prefix length for in-band or guard band operation may be the same with or longer or shorter than a target cyclic prefix length necessary for stand-alone operation. Additionally, 3.75 kHz subcarriers adjacent to 15 kHz subcarrier REs may be punctured. By this puncturing, interference to 15 kHz subcarrier may be mitigated.

FIGS. 4a, 4b, 4c, 4d, and 4e includes different subcarrier spacing and/or different CP length in each figure but each UE may not be aware of all resource elements other than resource elements which the UE identifies. For example, even if the eNB transmits signals in resource elements with both 3.75 kHz and 15 kHz subcarrier spacing, the UE which uses 3.75 kHz subcarrier spacing may not be aware of resource elements with 15 kHz subcarrier spacing.

According to FIG. 4a-e, a first set of subcarriers with first subcarrier spacing which is integer multiple or integer sub-multiple of second subcarrier spacing may be mapped such that in addition to a resource block boundary one or more of starting points (e.g. starting positions) or ending points (e.g., ending positions) of first subcarriers with the first subcarrier spacing in a first set of OFDM symbols are aligned with one or more of starting points (e.g. starting positions) or ending points (e.g. ending positions) of second subcarriers with the second subcarrier spacing in a second set of OFDM symbols.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE subcarrier spacing control module 126, and a UE cyclic prefix control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity.

The UE operations module 124 may provide the benefit of receiving a downlink signal efficiently. The UE subcarrier spacing control module 126 may provide switching different subcarrier spacing efficiently. The UE cyclic prefix control module 128 may provide switching different cyclic prefix length efficiently.

The UE operations module 124 may provide information 148 to the one or more receivers 120. For example, the UE operations module 124 may inform the receiver(s) 120 when or when not to receive transmissions based on the RRC message (e.g, broadcasted system information, RRC connection reconfiguration message), MAC control element, and/or the DCI (Downlink Control Information).

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB subcarrier spacing control module 194, and an eNB cyclic prefix control module 196. The eNB operations module 182 may include PHY entities, MAC entities, RLC entities, PDCP entities, and an RRC entity.

The eNB operations module 182 may provide the benefit of transmitting a downlink signal efficiently. The eNB subcarrier spacing control module 194 may provide switching different subcarrier spacing efficiently. The eNB cyclic prefix control module 196 may provide switching different cyclic prefix length efficiently.

The eNB operations module 182 may provide information 190 to the one or more receivers 178. For example, the eNB operations module 182 may inform the receiver(s) 178 when or when not to receive transmissions based on the RRC message (e.g, broadcasted system information, RRC connection reconfiguration message), MAC control element, and/or the DCI (Downlink Control Information).

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
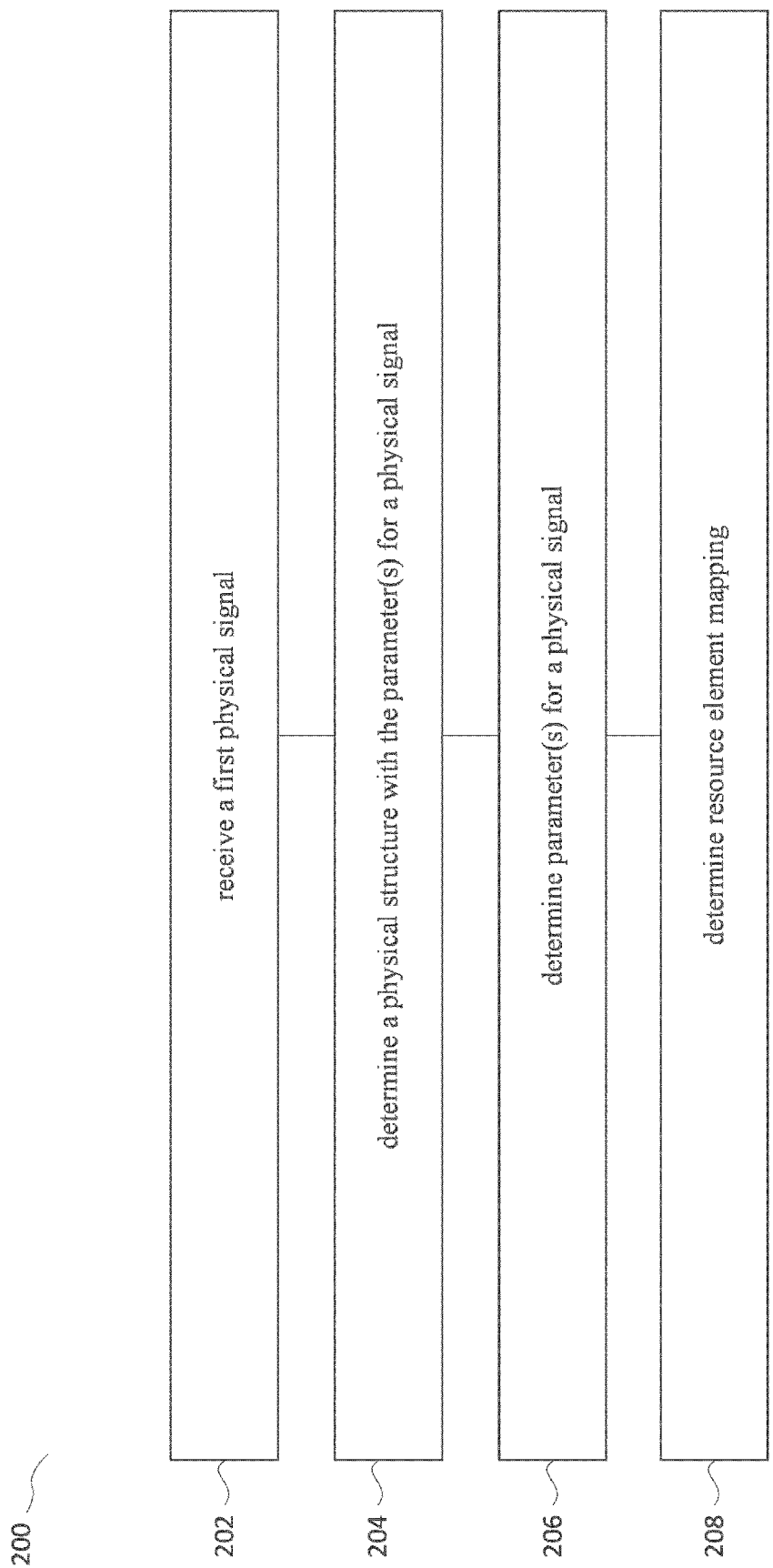
FIG. 2 is a flow diagram illustrating one implementation of a method for identifying a physical structure by a UE.

FIG. 2 is a flow diagram illustrating one implementation of a method 200 for identifying a physical structure by a UE 102.

The UE 102 may receive 202 a first physical signal. The first physical signal may be a primary synchronization channel, a secondary synchronization channel, a physical broadcast channel, a physical-layer cell identity, a physical-layer cell-identity group, and/or master information block. The UE 102 may determine 204 a physical structure with the parameter(s) for a physical signal based on first indication(s) (as described above). The UE 102 may determine 206 parameter(s) (e.g., $$\Delta f, N_{sc}^{RB}, N_{symb}^{DL},$$

the number of consecutive slots in a subframe, and/or cyclic prefix) for the physical signal. The physical channel may include a second physical signal. The physical channel may include a first physical signal and a second physical signal. The second physical signal may include physical channels and signals other than the first physical signal. The UE 102 may determine 208 resource element mapping. The resource element mapping may be determined based on the parameters above and/or the first indication (s). The resource element mapping (as shown in FIGS. 4a, 4b, 4c, 4d, and 4e as a example) may be defined for each one or more of $$\Delta f, N_{sc}^{RB}, N_{symb}^{DL},$$

the number of consecutive slots in a subframe, and cyclic prefix.

The resource elements may be identified by indices of subcarriers in frequency and indices of orthogonal frequency-division multiplexing (OFDM) symbols in time domains. OFDM symbols using a first cyclic prefix length in a first set of subcarriers may be mapped such that in addition to a slot boundary one or more of starting points (e.g. starting positions) or ending points (e.g. ending positions) of OFDM symbols using a first cyclic prefix length in a first set of subcarriers are aligned with one or more of starting points (e.g. starting positions) or ending points (e.g. ending positions) of OFDM symbols using a second cyclic prefix length in a second set of subcarriers which are used for a different physical structure than the first physical structure.

Figure 3:
FIG. 3 is a flow diagram illustrating one implementation of a method for generating multi-physical structure by an eNB.

FIG. 3 is a flow diagram illustrating one implementation of a method 300 for generating multi-physical structure by an eNB 160.

The eNB 160 may determine 302 a physical structure with parameter(s) (e.g., $$\Delta f, N_{sc}^{RB}, N_{symb}^{DL},$$

the number of consecutive slots in a subframe, and/or cyclic prefix) for a physical signal. The physical channel may include a second physical signal. The physical channel may include a first physical signal and a second physical signal. The second physical signal may include physical channels and signals other than the first physical signal. The eNB 160 may determine 304 first indication(s) for informing the UE 102 of a physical structure and/or the parameter(s) for a physical signal. The first indication(s) may be transmitted in signal(s) or included in signal(s) by the eNB 160. The eNB 160 may map 306 signals into resource elements according to the physical structure. The resource element mapping may be determined based on the parameters above and/or the first indication (s). The resource element mapping (as shown in FIGS. 4a, 4b, 4c, 4d, and 4e as a example) may be defined for each one or more of $$\Delta f, N_{sc}^{RB}, N_{symb}^{DL},$$

the number of consecutive slots in a subframe, and cyclic prefix. The eNB 160 may 308 generate one or more physical structures including one or more set of resource elements with different parameter(s) for the physical signal (e.g., resource elements for 3.75 kHz subcarrier spacing and 15 kHz subcarrier spacing are included in one cell). The eNB 160 may transmit 310 a first physical signal (e.g., for each physical structure). As described in explanations in FIG. 2, The first physical signal may be a primary synchronization channel, a secondary synchronization channel, a physical broadcast channel, a physical-layer cell identity, a physical-layer cell-identity group, and/or master information block.

Figure 5:
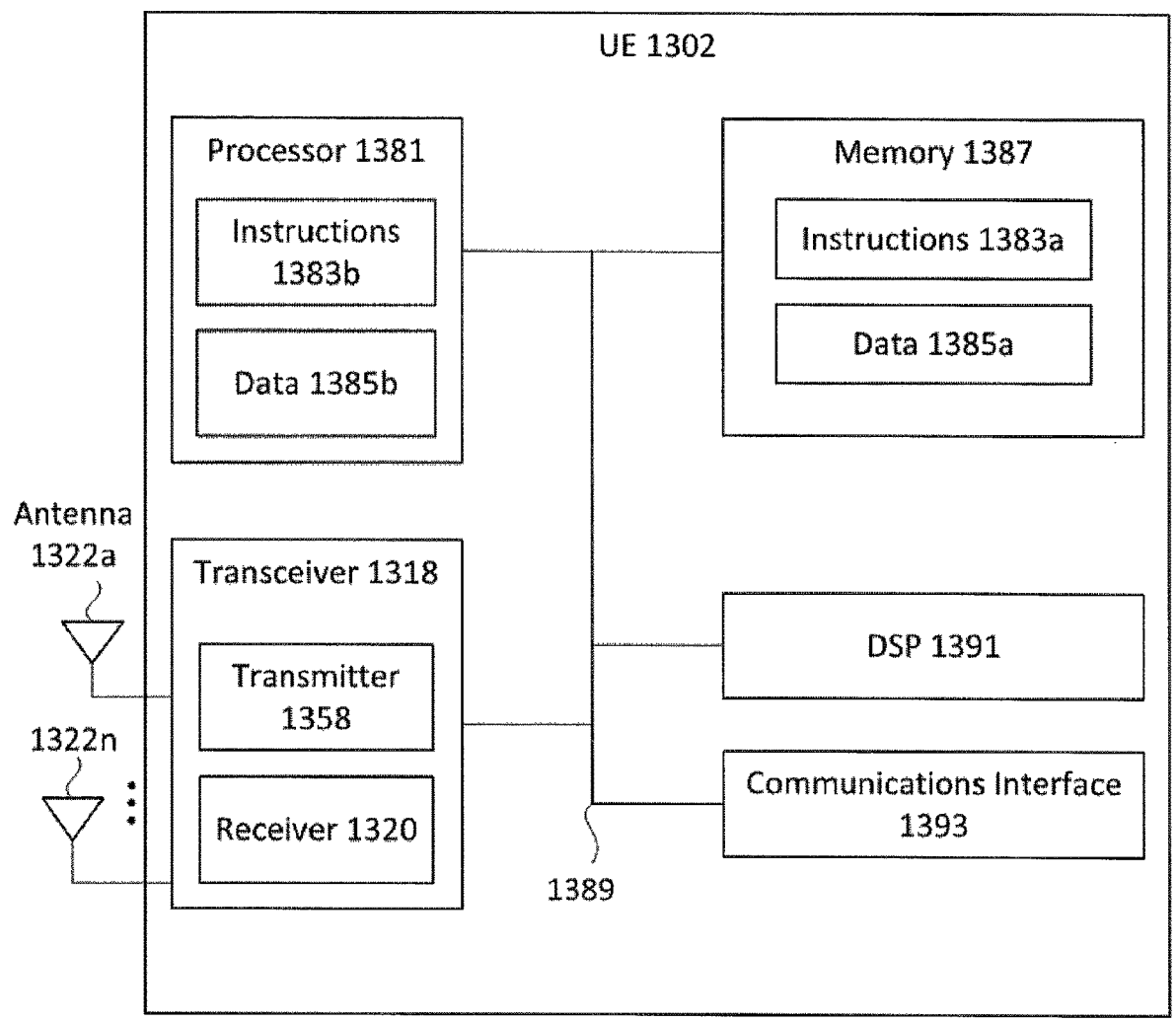
FIG. 5 illustrates various components that may be utilized in a UE.

FIG. 5 illustrates various components that may be utilized in a UE 1302. The UE 1302 described in connection with FIG. 5 may be implemented in accordance with the UE 102 described in connection with FIG. 1. The UE 1302 includes a processor 1381 that controls operation of the UE 1302. The processor 1381 may also be referred to as a central processing unit (CPU). Memory 1387, which may include read-only memory (ROM), random access memory (RAM), a combination of the two or any type of device that may store information, provides instructions 1383a and data 1385a to the processor 1381. A portion of the memory 1387 may also include non-volatile random access memory (NVRAM). Instructions 1383b and data 1385b may also reside in the processor 1381. Instructions 1383b and/or data 1385b loaded into the processor 1381 may also include instructions 1383a and/or data 1385a from memory 1387 that were loaded for execution or processing by the processor 1381. The instructions 1383b may be executed by the processor 1381 to implement one or more of the methods 200 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1389, which may include a power bus, a control signal bus and a status signal bus, in addition to a data bus. However, for the sake of clarity, the various buses are illustrated in FIG. 5 as the bus system 1389. The UE 1302 may also include a digital signal processor (DSP) 1391 for use in processing signals. The UE 1302 may also include a communications interface 1393 that provides user access to the functions of the UE 1302. The UE 1302 illustrated in FIG. 5 is a functional block diagram rather than a listing of specific components.

FIG. 6 illustrates various components that may be utilized in an eNB 1460. The eNB 1460 described in connection with FIG. 6 may be implemented in accordance with the eNB 160 described in connection with FIG. 1. The eNB 1460 includes a processor 1481 that controls operation of the eNB 1460. The processor 1481 may also be referred to as a central processing unit (CPU). Memory 1487, which may include read-only memory (ROM), random access memory (RAM), a combination of the two or any type of device that may store information, provides instructions 1483a and data 1485a to the processor 1481. A portion of the memory 1487 may also include nonvolatile random access memory (NVRAM). Instructions 1483b and data 1485b may also reside in the processor 1481. Instructions 1483b and/or data 1485b loaded into the processor 1481 may also include instructions 1483a and/or data 1485a from memory 1487 that were loaded for execution or processing by the processor 1481.

The instructions 1483*b* may be executed by the processor 1481 to implement one or more of the methods 300 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the eNB 1460 are coupled together by a bus system 1489, which may include a power bus, a control signal bus and a status signal bus, in addition to a data bus. However, for the sake of clarity, the various buses are illustrated in FIG. 6 as the bus system 1489. The eNB 1460 may also include a digital signal processor (DSP) 1491 for use in processing signals. The eNB 1460 may also include a communications interface 1493 that provides user access to the functions of the eNB 1460. The eNB 1460 illustrated in FIG. 6 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method by a user equipment (UE), comprising:
   receiving a first physical signal;
   determining a first physical structure based on information in the first physical signal; and
   determining resource elements based on the first physical structure,
   wherein the first physical structure includes the resource elements;
   the resource elements are identified by indices of subcarriers in frequency and indices of orthogonal frequency-division multiplexing (OFDM) symbols in time domains; and
   a first set of subcarriers with first subcarrier spacing which is integer multiple or integer sub-multiple of second subcarrier spacing are mapped such that a starting time position or an ending time position of a first OFDM symbol of a first set of OFDM symbols comprising first subcarriers with the first subcarrier spacing is aligned with a starting time position or an ending time position of a second OFDM symbol of a second set of OFDM symbols comprising second subcarriers with the second subcarrier spacing, wherein
   the starting time position or the ending time position in the first OFDM symbol is different from a position of a slot boundary,
   the starting time position or the ending time position in the second OFDM symbol is different from the position of the slot boundary, and
   a time length of the first OFDM symbol is different from a time length of the second OFDM symbol.

2. The method of claim 1, wherein cyclic prefix length for the first subcarrier spacing is defined such that OFDM symbols are aligned in time domain in at least one or more of starting time positions or ending time positions of OFDM symbols between subcarriers with the first subcarrier spacing and subcarriers with the second subcarrier spacing.

3. A method by a base station, comprising:
   transmitting a physical broadcasting channel including information on resource elements to which signals are mapped, wherein
   the resource elements are identified by indices of subcarriers in frequency and indices of orthogonal frequency-division multiplexing (OFDM) symbols in time domains; and
   a first set of subcarriers with first subcarrier spacing which is integer multiple or integer sub-multiple of second subcarrier spacing are mapped such that a starting time position or an ending time position of a first OFDM symbol of a first set of OFDM symbols comprising first subcarriers with the first subcarrier spacing is aligned with a starting time position or an ending time position of a second OFDM symbol of a second set of OFDM symbols comprising second subcarriers with the second subcarrier spacing, wherein
   the starting time position or the ending time position in the first OFDM symbol is different from a position of a slot boundary,
   the starting time position or the ending time position in the second OFDM symbol is different from the position of the slot boundary,
   a time length of the first OFDM symbol is different from a time length of the second OFDM symbol,
   a cyclic prefix length of one OFDM symbol of the first set of the OFDM symbols is different from a cyclic prefix length of another OFDM symbol of the first set of OFDM symbols, and
   a cyclic prefix length of one OFDM symbol of the second set of the OFDM symbols is different from a cyclic prefix length of another OFDM symbol of the second set of OFDM symbols.

4. The method of claim 3, wherein cyclic prefix length for the first subcarrier spacing is defined a time boundary of OFDM symbol such that OFDM symbols are aligned in time domain in at least one or more of starting time positions or ending time positions of OFDM symbols between subcarriers with the first subcarrier spacing and subcarriers with the second subcarrier spacing.

5. A user equipment (UE), comprising:
a processor; and
a memory in electronic communication with the processor, wherein instructions stored in the memory are executable to:
receive a first physical signal;
determine a first physical structure based on information in the first physical signal; and
determine resource elements based on the first physical structure,
wherein the first physical structure includes the resource elements;
the resource elements are identified by indices of subcarriers in frequency and indices of orthogonal frequency-division multiplexing (OFDM) symbols in time domains; and
a first set of subcarriers with first subcarrier spacing which is integer multiple or integer sub-multiple of second subcarrier spacing are mapped such that a starting time position or an ending time position of a first OFDM symbol of a first set of OFDM symbols comprising first subcarriers with the first subcarrier spacing is aligned with a starting time position or an ending time position of a second OFDM symbol of a second set of OFDM symbols comprising second subcarriers with the second subcarrier spacing, wherein
the starting time position or the ending time position in the first OFDM symbol is different from a position of a slot boundary,
the starting time position or the ending time position in the second OFDM symbol is different from the position of the slot boundary, and
a time length of the first OFDM symbol is different from a time length of the second OFDM symbol.

6. The UE of claim 5, wherein cyclic prefix length for the first subcarrier spacing is defined such that OFDM symbols are aligned in time domain in at least one or more of starting time positions or ending time positions of OFDM symbols between subcarriers with the first subcarrier spacing and subcarriers with the second subcarrier spacing.

7. A base station, comprising:
a processor; and
a memory in electronic communication with the processor, wherein instructions stored in the memory are executable to:
transmit a physical broadcasting channel including information on resource elements to which signals are mapped, wherein
the resource elements are identified by indices of subcarriers in frequency and indices of orthogonal frequency-division multiplexing (OFDM) symbols in time domains; and
a first set of subcarriers with first subcarrier spacing which is integer multiple or integer sub-multiple of second subcarrier spacing are mapped such that a starting time position or an ending time position of a first OFDM symbol of a first set of OFDM symbols comprising first subcarriers with the first subcarrier spacing is aligned with a starting time position or an ending time position of a second OFDM symbol of a second set of OFDM symbols comprising second subcarriers with the second subcarrier spacing, wherein
the starting time position or the ending time position in the first OFDM symbol is different from a position of a slot boundary,
the starting time position or the ending time position in the second OFDM symbol is different from the position of the slot boundary,
a time length of the first OFDM symbol is different from a time length of the second OFDM symbol,
a cyclic prefix length of one OFDM symbol of the first set of the OFDM symbols is different from a cyclic prefix length of another OFDM symbol of the first set of OFDM symbols, and
a cyclic prefix length of one OFDM symbol of the second set of the OFDM symbols is different from a cyclic prefix length of another OFDM symbol of the second set of OFDM symbols.

8. The base station of claim 7, wherein cyclic prefix length for the first subcarrier spacing is defined such that OFDM symbols are aligned in time domain in at least one or more of starting time positions or ending time positions of OFDM symbols between subcarriers with the first subcarrier spacing and subcarriers with the second subcarrier spacing.

* * * * *